United States Patent [19]
Scibilia

[11] 3,872,486
[45] Mar. 18, 1975

[54] PHOTOGRAPHIC APPARATUS EMPLOYING VARIABLE PRESSURE PLATE STRUCTURE

[75] Inventor: Peter A. Scibilia, Westwood, Mass.

[73] Assignee: Polaroid Corporation, Cambridge, Mass.

[22] Filed: Dec. 19, 1973

[21] Appl. No.: 426,127

[52] U.S. Cl. .................. 354/88, 352/75, 352/130
[51] Int. Cl. ........................................... G03b 17/50
[58] Field of Search ....... 352/72, 75, 76, 78 R, 130, 352/226; 354/77, 78, 88, 297, 317, 331

[56] References Cited
UNITED STATES PATENTS
| | | | |
|---|---|---|---|
| 2,095,850 | 10/1937 | Wittel | 352/75 |
| 2,143,769 | 1/1939 | Fairbanks | 352/76 |
| 3,771,861 | 11/1973 | Land | 352/130 |
| 3,809,327 | 5/1974 | Osman | 352/130 X |

*Primary Examiner*—Fred L. Braun
*Attorney, Agent, or Firm*—David R. Thornton

[57] ABSTRACT

Photographic cassette for use with camera and projector apparatus for exposing, processing and projecting a cassette contained strip of photographic film including an applicator for depositing a thin layer of the processing fluid on the film and a pressure plate, for supporting progressive incremental sections of the film in a predetermined focal plane, having a finger portion which is displaceable following exposure operations so as to uncover the pressure plate aperture and provide a longitudinal channel in the pressure plate thereby permitting transmission of projection illumination and clearance for the fluid layer.

15 Claims, 8 Drawing Figures

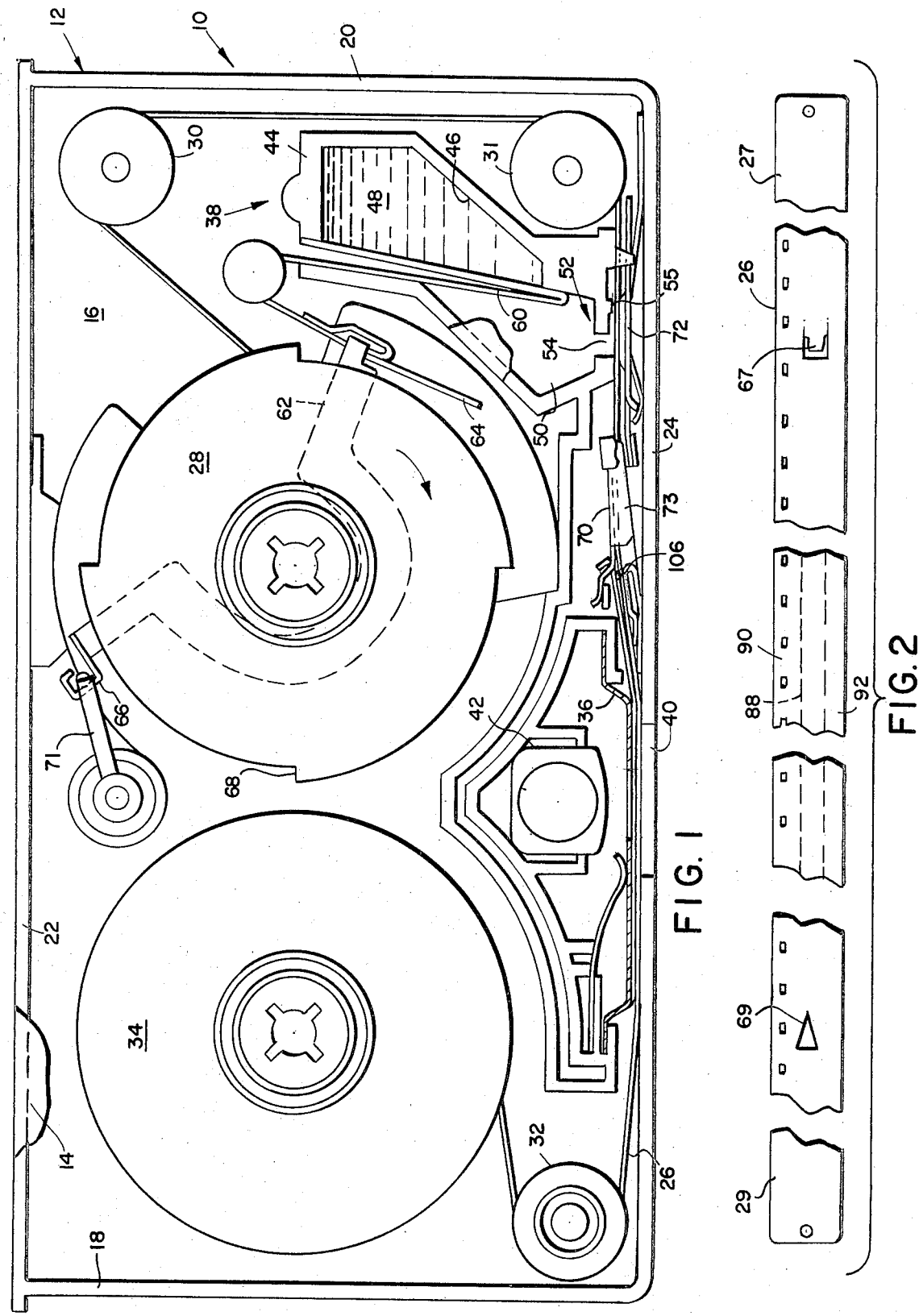

PHOTOGRAPHIC APPARATUS EMPLOYING VARIABLE PRESSURE PLATE STRUCTURE

BACKGROUND OF THE INVENTION

This invention relates to processing apparatus and, more particularly, an improved multipurpose film handling cassette for exposing, processing and projecting images of photographic film.

Multipurpose photographic film cassettes have been developed for use in motion picture photographic systems capable of processing an exposed strip of photographic material to a viewable condition as illustrated and described in such prior references as U.S. Pat. No. 3,615,127 issued to Edwin H. Land on Oct. 26, 1971; U.S. Pat. No. 3,623,417 issued Nov. 30, 1971 to Vaito K. Eloranta; and U.S. Pat. No. 3,748,994 issued July 31, 1973 to Joseph A. Stella, all of which are owned by the assignee of the present invention.

In such systems, use is made of a film handling cassette within which the several operations of exposure, chemical processing, drying and projection of the recorded images may be accomplished without transferring the film from the cassette. In this arrangement, the strip of photographic film contained in the cassette can be exposed in a camera adapted to receive the cassette and then processed to provide viewable images by placing the cassette in a viewing apparatus equipped to activate the cassette contained processor upon rewinding the exposed film strip. After processing in this manner, the viewing apparatus is operated as a projector to advance the film incrementally frame by frame past a light source for viewing of the recorded images.

In this arrangement, the unexposed photosensitive strip, initially would upon a supply reel, preferably passes from the supply reel through a normally inoperable processing station and then across an opening of the cassette which functions at different intervals as both an exposure and projection station. Beyond the exposure station, the film is wound onto a take-up reel.

Preferably when substantially the entire length of the photosensitive strip in the cassette has been exposed and wound onto the take-up reel, the cassette is then loaded into a special purpose projector in which the motion of the film is reversed, this time passing from the take-up reel onto the supply reel. In its movement in this reverse direction, the film strip is subjected to a processing treatment in which a thin layer of processing fluid is applied to the portion of the film emulsion intermediate the film margins by means such as, for example, a doctor blade in communication with and supplied with processing fluid from a fluid reservoir. Just following the fluid deposition, the film is again advanced through the exposure-processing station for projection operations and to completely dry the film.

It can be appreciated that each of these operations places different restrictions on the cassette and its operational elements. During exposure and projection operations it is desirable to locate progressive incremental sections of the film in a precise plane while image-carrying rays are transmitted to the outer surface of the film strip. For projection, however, illumination is transmitted to the inner surface of the film strip and outwardly of the cassette. Further, it is important to avoid disturbance of the processing fluid layer, particularly during operations just subsequent to the fluid deposition when the film strip is still not fully dried.

These requirements have been met by providing an apertured pressure plate having a longitudinal channel therein which supports the film margins of the incremental section in the focal plane for both reception of image-carrying rays during exposure operations and transmission of illumination during projection operations while also providing clearance for the processing fluid layer.

While the above arrangement is generally satisfactory, it can be appreciated that supporting only the film margins can permit deviation of the intermediate portion of the film from the focal plane which makes the cassette performance somewhat sensitive to the interfacing arrangements of the camera apparatus.

Accordingly, it is a primary object of this invention to provide an improved photographic cassette and system.

Another primary object of this invention is to provide a compact photographic cassette configured for cooperation with other apparatus to expose, process and project images of a film strip without removing the latter from the cassette.

A further object of this invention is to provide an improved photographic cassette for supporting incremental sections of photographic material in a precise focal plane and for preventing contact with processing fluid applied to the film during subsequent film operations.

Still another object of this invention is to provide an improved motion picture system which efficiently positions the photographic film in a suitable focal plane for both exposure and projection operations.

SUMMARY OF THE INVENTION

The photographic system of the present invention includes means for supporting the full width of an incremental section of a film strip in a precise focal plane during exposure operations and for thereafter supporting only the margins of the film strip so as to permit transmission of illumination for projection purposes and clearance for a processing fluid layer.

In the illustrated embodiment, the film strip is permanently retained within a film handling cassette which includes a normally inoperative processing station designed to deposit a thin layer of processing fluid on the cassette contained film strip following exposure and a pressure plate designed to support progressive incremental sections of the film strip as the latter is advanced across an exposure opening in the cassette wall. The pressure plate includes a longitudinal channel which terminates in a pair of laterally spaced surfaces configured to support the film margins and a displaceable member mounted for movement between a first position where the displaceable member in cooperation with the spaced surfaces provides a substantially smoothly contoured surface for supporting substantially the full width of the progressive incremental sections and a second position where the member is displaced from between the spaced surfaces and out of film contact so as to permit transmission of illumination through the pressure plate for image projection and clearance for the processing fluid layer.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof will best be understood from the following description of the preferred embodiment when read in connection with the accompanying drawings wherein like numbers have been employed in the different figures to denote the same parts and wherein:

FIG. 1 is a diagrammatic plan view, partially cut away, of a film handling cassette employing the present invention;

FIG. 2 is a plan view of the photographic film strip employed in the cassette of FIG. 2;

DETAILED DESCRIPTION OF THE PREFERRED EMBODIMENT

Figure 3:
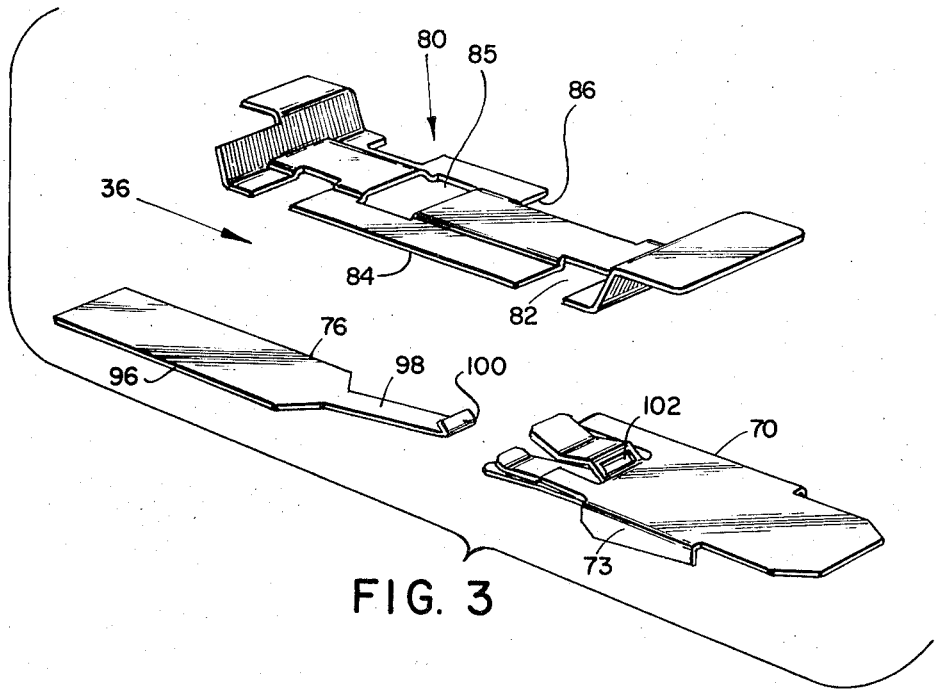
FIG. 3 is an exploded view in perspective illustrating the pressure plate and a processor element of the cassette.

In FIG. 1 of the drawings, a multipurpose film cassette in accordance with the present invention is generally designated by the reference numeral 10 and includes an essentially parallelepiped casing or housing 12 constituted by large planar faces or side walls 14 and 16, end walls 18 and 20, and elongated top and bottom edge walls 22 and 24. Carried within the housing 12 is a photographic film strip 26 which is permanently attached at one of its trailing ends 27 shown in FIG. 2 to a rotatable supply spool or reel 28 from which it extends within the casing 12 in a somewhat extended path around suitable rollers 30, 31 and 32 to a take-up spool or reel 34 to which the opposite or leading end 29 of the film strip is attached. In its path within the casing 12, the film strip 26 extends through a normally inoperative film processor 38, which is subsequently explained in detail, and across an opening 40 which functions at different times to facilitate both exposure and projection operations. A pressure plate 36, later explained in detail, is mounted behind the film strip 26 to support the latter within the opening 40. Further, for enabling the projection operation, a reflecting prism 42 is mounted behind the film strip 26 is an adjoining relation to both the opening 40 and to an illumination aperture (not shown) of the side wall 14.

The film processor 38 includes a housing 44 having a first compartment or receptacle 46 retaining a source of processing fluid or composition 48 mounted to one side of a second internal chamber 50 which communicates with a nozzle area generally designated by the reference numeral 52. The nozzle 52 includes an opening 54 which permits fluid to flow to the film strip 26. A doctor blade 55 located behind the opening 54 defines a thin coating 49 (shown in FIG. 8) of the fluid 48 on a centrally located portion of the film 26.

The fluid 48 is initially retained within the sealed tublike receptacle 46 by a tear tab 60 which extends from the processor housing 44 to a tab actuating assembly generally designated by the numeral 62. The actuating assembly 62 which is biased towards the processor 38 by a spring member 64 extends beneath the film spool 28 to an end portion 66 which is configured for engagement with teeth 68 formed on this spool. The end portion 66 is retained in an initial position by a release cam mechanism 71. As explained in the aforementioned U.S. Pat. No. 3,748,994, upon insertion of the cassette 10 into a projector (not shown) and operation of the cam release mechanism 71, the tab actuating assembly 62 is released to bring its end portion 66 into engagement with the teeth 68 of the spool 28. Then upon rotation of the film spool 28 in the rewind direction, (clockwise as shown by the arrow in FIG. 1), one of the spool teeth 68 operatively engages the end portion 66 to rotate the actuating assembly 62 along with the spool 28 so as to draw the tab 64 from the fluid receptacle 46 and thereby release the retained fluid 48 to the chamber 50 and through its nozzle opening 54 to the underlying portions of the film strip 26.

Incorporated in the processor 38 is a nozzle valve 70 which as later explained in detail with respect to the operation of the cassette is utilized to close off the processor nozzle 52 and thereby disable the processor, following treatment of the film strip 26 with the processing fluid 48. In relation to the nozzle opening 56, the valve 70 is positioned initially to the left as shown in FIG. 1 or in front of the nozzle opening in terms of film strip travel during rewind. Additionally, a pressure pad component designated at 72 is positioned beneath the nozzle opening 54 and slightly to the right thereof as shown in FIG. 1, or that is, slightly rearwardly of this opening in terms of film strip travel during rewind. In these initial positions, neither the valve 70 or the pressure pad 72 restricts free travel of the film strip during the exposure operation in which film travel is in a direction opposite to that during rewind. The viewing apparatus (not shown) in which the film strip is processed is programmed such that just prior to release of the tear tab 60 in a manner described above, the film strip 26 is advanced through a final travel from the supply spool 28 to the take-up spool 34. During this final travel, a discontinuity on the film strip 26, for example, a protuberance 67 located at the supply spool or trailing end 27 of the film strip, engages the pressure pad 72 to displace it slightly to the left from the position illustrated in FIG. 1, so that its film engaging surface 74 is brought under and into juxtaposition with the nozzle opening 54 to thereby retain an interposed, incremental portion of the film strip 26 firmly against the undersurface of the applicator housing 44.

Following the processing operation and also as a result of another film discontinuity, for example, an opening 69 located at the leading or take-up end 29 of the film strip, the valve 70 is moved to the right from the position illustrated in FIG. 1 so that it underlies and blocks the nozzle opening 54. As later explained in detail with regard to FIGS. 5 and 6, a finger member 76 of the pressure plate 36 is withdrawn from the latter. Further, during this displacement of the valve 70, the pressure pad 72 is cammed downwardly away from the film strip 26 by side cams 73 of the valve so as to deactivate the pressure pad and to free the film strip 26 for unrestricted travel in either direction for subsequent projection and rewind cycles.

As previously indicated, a pressure plate 36 is mounted in the cassette housing 12 behind the cassette opening 40 to support sequents of the film strip 26 in a proper focal location, preferably in a focal plane. As can be seen more clearly in FIG. 3, the pressure plate 36 comprises a plate member 80 having a substantially centrally located aperture 85, and a longitudinal channel 82 which terminates in a pair of laterally spaced film reference surfaces 84 and 86 which is later explained in detail are spaced apart a distance equal to or exceeding the width of the useable emulsion portion 88 intermediate the margins 90 and 92 of the film strip as shown in FIG. 2. Hence, the surface 84 and 86 are configured to engage and support only the film margins at the exposure-projection opening 40 so that during projection operations, clearance is provided for the fluid layer (not shown) which is deposited on the intermediate portion 88 of the emulsion during the aforementioned processing operation.

Figure 4:
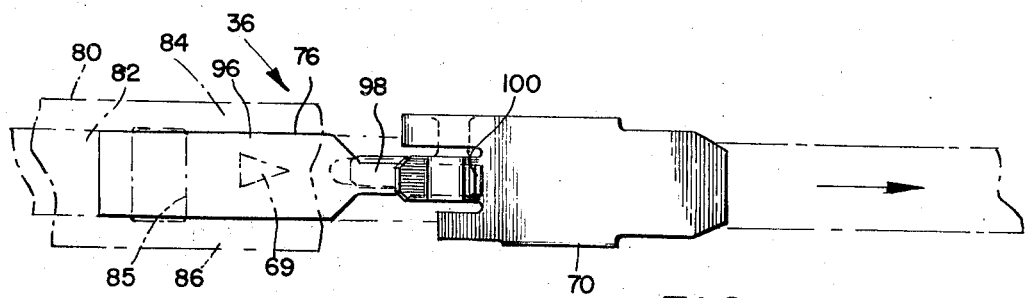
FIGS. 4 and 5 are plan views of the elements shown in FIG. 3, illustrating the displacement of the pressure plate finger during operation of the cassette.

As shown more clearly in FIG. 4, the displaceable member or pressure plate finger 76 includes a body portion 96 which is initially located in the plate channel 82 and cooperates with the surfaces 84 and 86 to provide a smoothly contoured surface for support of the full width of the film strip 26 during exposure operations.

Figure 5:
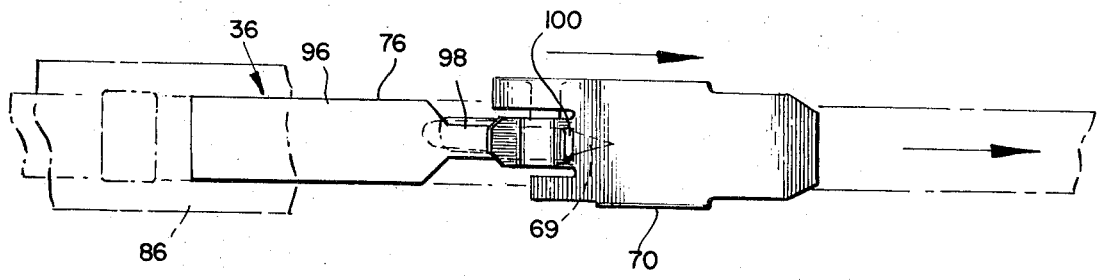

Extending from the body member 96 is an extended arm 98 which is folded back upon itself as at 100. The latter permits the arm 98 to be passed through an opening 102 in the valve 70 so as to couple the valve to the plate finger 98. Consequently, as shown in FIGS. 4 and 5, displacement of the valve 70 to the right (as shown by the arrow in these figures) during processing, at the end of the first rewind of the film when the film hole 69 engages the valve 70 to close off the nozzle 52, also withdraws the finger body 96 from the channel 82.

Figure 6:
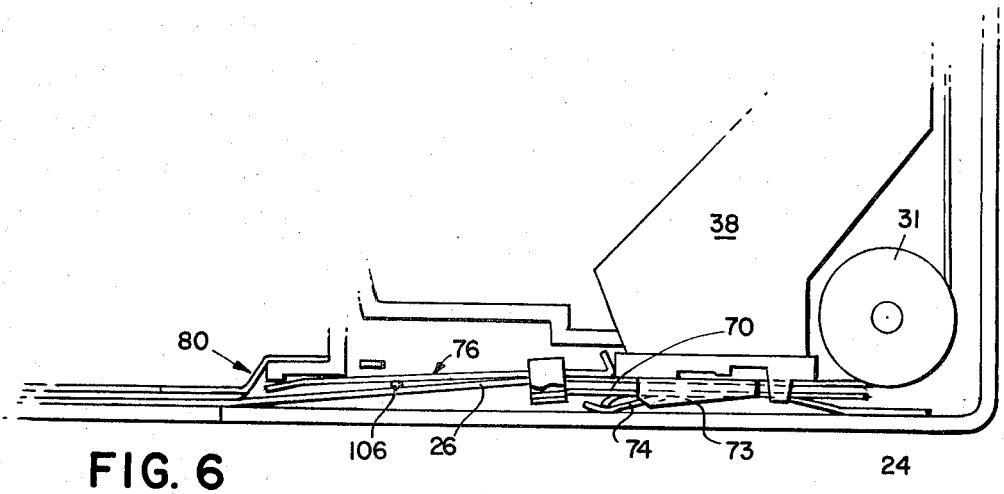
FIG. 6 is a fragmentary view in elevation illustrating the condition of the pressure plate and processor nozzle arrangement of the cassette following deposition of processing fluid.

Displacement of the finger from the channel 82 uncovers the pressure plate aperture 85 and opens the channel. Further, as the finger 76 is displaced, to its final position as shown in FIG. 6, it is also moved out of the film path since the finger is carried slightly upwardly across a deflector member or spring 106. Consequently, as shown in this figure, the finger 76 is also lifted out of film engagement as it is displaced to its final position.

Figure 7:
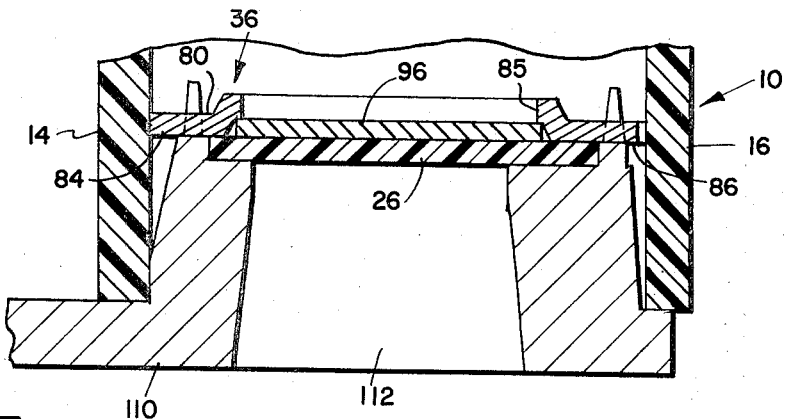
FIG. 7 is a view in section taken laterally through the center of the pressure plate and illustrating the operating conditions of the latter when the cassette is operatively located in a camera.

In the operation of the cassette 12 as previously noted, the cassette is initially mounted within a camera where the cassette opening 40 and its pressure plate assembly 36 is juxtaposed with an aperture plate 110 as shown in FIG. 7. At this time, the body 96 of the displaceable finger 76 fills a major portion of the channel 82 and supports the full width of the film strip over the aperture 112 of the aperture plate 110 so as to provide support for the full width of the film section located over this aperture.

Figure 8:
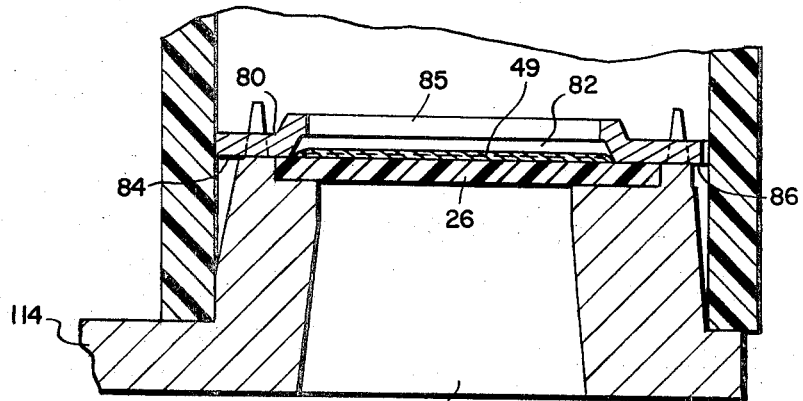
FIG. 8 is a further view of the pressure plate illustrating the operating conditions of the laltter following processing operations in a projector.

For exposure, the film is then advanced stepwise across the aperture 112 by a conventional claw (not shown) so as to expose progressive incremental sections of the film strip 26 to image-carrying rays passed by the camera lens (not shown). Upon completion of exposure of substantially the full length of the film, the cassette 10 is then mounted in a viewer or projector apparatus where its opening 40 is located in juxtaposition with a projector aperture plate 114 (as shown in FIG. 8) which is similar to the camera aperture plate but configured to clamp the film margins more tightly than can be achieved in the portable battery operated camera.

Upon insertion of the cassette 12 in the viewer, the supply reel (shown in FIG. 2) is driven clockwise to rewind the film. During this rewind, the fluid is deposited (as previously explained) as a thin layer 49 on the film portion intermediate its margins. As the leading end 29 of the film is reached, the slide valve 70 is displaced to the right into its processor disabling position which carries the plate finger 76 from the channel 82 and out of film engagement so as to uncover the plate aperture 85 and to provide clearance between the plate 80 and the fluid layer 49 as shown in FIG. 8, during subsequent advancement of the film. Just following rewind, the film is again advanced stepwise across the exposure-projection opening 40 by a claw (not shown) so as to locate progressive incremental sections of the film over the projector aperture 116. At this time illumination is directed through the pressure plate aperture 85 and each of the now visible film frames (not shown).

Those familiar with the motion picture arts will readily appreciate the novel and highly unique advantages of this photographic system and cassette which supports incremental sections of the film strip in a precise focal location during exposure, and then provides clearance to the usable emulsion and a processing fluid layer carried thereon for subsequent projection operations.

This invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

What is claimed is:

1. A photographic film handling cassette for use with other apparatus for first exposing a strip of photographic film material and for subsequently projecting images recorded on such film strip, said casette comprising:

a housing for retaining such film strip, said housing including an opening for exposing progressive incremental sections of such film strip;

means responsive to drive means of such other apparatus for advancing such film along a given path within said housing, said given path traversing said opening with one surface of such film strip facing inwardly of said housing;

a pressure plate assembly located within said housing at said opening for supporting substantially the full width of such incremental sections in a predetermined focal location as such sections are progressively located in said opening, said pressure plate assembly including a plate having an aperture extending therethrough and terminating in at least a pair of laterally spaced apart surfaces configured for engaging the longitudinal margins of such film strip and a displaceable member mounted for displacement between a first position wherein one surface of said member complements said laterally spaced apart surfaces to provide a substantially smooth support for substantially the entire width of such film strip where it is disposed across such predetermined focal location to facilitate exposure operations and a second position wherein said member does not serve to cover said aperture to facilitate projection operations.

2. The cassette of claim 1 wherein said spaced apart surfaces and said one surface of said displaceable member form and define a precise focal plane when said member is located in its said first position.

3. The cassette of claim 1 wherein said displaceable member is displaced between its said first and second position responsive to film advancement in a given direction to a given point.

4. The cassette of claim 1 additionally including an applicator configured for depositing a layer of processing fluid on at least a length of the film portion intermediate the longitudinal margins thereof and wherein said pressure plate includes a longitudinal channel which terminates in said spaced surfaces, and said displaceable member is mounted for displacement from its said first position to a second position wherein it is removed from said channel and out of film contact so as to prevent engagement with and disturbance of such fluid layer during advancement of such film strip across said pressure plate subsequent to said processing operation.

5. A photographic film handling cassette for use with other apparatus for first exposing a strip of photographic film material, for then treating such film strip with processing fluid so as to develop viewable images on such film strip, and for subsequently projecting such images, said cassette comprising:
  a housing for retaining such film strip, said housing including an opening for exposing progressive incremental sections of such film strip;
  means responsive to drive means of such other apparatus for advancing such film in a given path within said housing, said given path traversing said opening with one surface of such film strip facing inwardly of said housing;
  film processing means for depositing a layer of processing fluid on at least a portion of such one surface intermediate the margins of such film strip following exposure of such section;
  a pressure plate assembly located within said housing at said opening for supporting substantially the full width of such incremental sections in a predetermined focal location as such sections are progressively located in said opening during such exposure operations, said pressure plate assembly including a pair of surfaces laterally spaced apart so as to define a channel extending along the longitudinal axis of such film strip, said spaced surfaces configured for supporting the margins of such one surface of said film strip, and said pressure plate assembly including a displaceable member mounted for displacement between a first position wherein one surface of said member complements said spaced apart surfaces to provide a substantially smooth support for substantially the entire width of such film strip where it is disposed across such predetermined focal location and a second position wherein said member is displaced from said spaced apart surfaces so as to present said channel to such film strip whereby said pressure plate assembly provides support of the full width of such incremental sections at said opening when said member is in its first position and support of only the margins of such film strip when said member is in its said second position.

6. The cassette of claim 5 wherein said spaced apart surfaces and said one surface of said displaceable member form and define a precise focal plane when said member is located in its said first position.

7. The cassette of claim 5 wherein said displaceable member is displaced between its said first and second position responsive to film advancement in a given direction to a given point.

8. The cassette of claim 5 wherein said film processing means includes selectively operable means for disabling such processing means following deposit of such fluid layer, and said displaceable member is coupled to said disabling means so as to be displaced from its said first to its said second position responsive to operation of said disabling means.

9. The cassette of claim 8 wherein said processing means includes a nozzle opening configured for releasing fluid to such film strip, said disabling means includes a valve member configured for movement between a first position adjoining said nozzle opening and a second position wherein said valve is in blocking engagement with said nozzel opening, and said displaceable member is coupled to said valve member for movement between its said first to its said second position responsive to displacement of said valve member from its said first to its said second position.

10. The cassette of claim 9 wherein said valve member is displaced between its said positions responsive to film advancement in a given direction to a given point.

11. A photographic system for exposing a strip of photographic material to record scene images thereon, treating one surface of such film strip with a processing fluid to develop such images to a viewable condition and for subsequently projecting such viewable images, said system comprising:
  means for advancing such film strip along a given path so as to locate progressive incremental sections of such film strip in a given focal location for exposure operations and for subsequently advancing such film strip along said given path for projection operations;
  means for depositing a layer of processing fluid on such film strip on at least a portion of such one surface intermediate the longitudinal margins of such film strip;
  means for engaging a length of at least one side of such film strip so as to support each such progressive incremental section at such given focal location during exposure operations and for subsequently only engaging the margins of such length of such film strip during such projection operations so as to thereby provide clearance for such layer of processing fluid, said engaging means including a pressure plate assembly comprising spaced apart means for engaging the margins of such one side of such film strip and a member mounted for displacement between a first position wherein one surface of said member complements said spaced apart means to provide therewith a substantially smooth support for substantially the entire width of such film strip where it is disposed across such focal location and a second position wherein said member is displaced from between said spaced apart means and out of film contact so as to preclude engagement with the portion of such one surface of said film strip intermediate the margins thereof during operations subsequent to exposure.

12. The cassette of claim 11 wherein said spaced apart means and said one surface of said displaceable member form and define a precise focal plane when said member is located in its said first position.

13. The cassette of claim 11 wherein said displaceable member is displaced between its said first and second position responsive to film advancement in a given direction to a given point.

14. Photographic apparatus for first exposing a strip of photographic film material, for then treating such film strip with processing fluid, and for subsequently projecting images recorded on such film strip, said apparatus comprising:

a housing for retaining such film strip, said housing including an opening for exposing and subsequently projecting images recorded on progressive incremental sections of such film strip;

means for advancing such film strip along a given path within said housing, said given path traversing said opening;

a pressure plate assembly located within said housing at said opening for supporting substantially the full width of such incremental sections in a predetermined focal location as such sections are progressively located at said opening, said pressure plate assembly including a plate having a longitudinal channel defined in part by at least a pair of laterally spaced apart surfaces configured for engaging the longitudinal margins of such film strip and a displaceable member mounted for displacement between a first position wherein one surface of said member complements said laterally spaced apart surfaces to provide a substantially smooth support for substantially the entire width of such film strip where it is disposed across such predetermined focal location to facilitate exposure operations and a second position wherein said member is removed from said channel to facilitate processing and projection operations.

15. Photographic apparatus for first exposing a strip of photographic film material and for subsequently projecting images recorded on such film strip, said apparatus comprising:

a housing for retaining such film strip, said housing including an opening for exposing and subsequently projecting images recorded on progressive incremental sections of such film strip;

means for advancing such film strip along a given path within said housing, said given path traversing said opening;

a pressure plate assembly located within said housing at said opening for supporting substantially the full width of such incremental sections in a predetermined focal location as such sections are progressively located at said opening, said pressure plate assembly including a plate having an aperture extending therethrough and terminating in at least a pair of laterally spaced apart surfaces configured for engaging the longitudinal margins of such film strip and a displaceable member mounted for displacement between a first position wherein one surface of said member complements said laterally spaced apart surfaces to provide a substantially smooth support for substantially the entire width of such film strip where it is disposed across such predetermined focal location to facilitate exposure operations and a second position wherein said member does not serve to cover said aperture to facilitate projection operations.

* * * * *